US010563737B2

(12) United States Patent
Hasegawa et al.

(10) Patent No.: US 10,563,737 B2
(45) Date of Patent: Feb. 18, 2020

(54) CONTROL DEVICE FOR AUTOMATIC TRANSMISSION

(71) Applicant: TOYOTA JIDOSHA KABUSHIKI KAISHA, Toyota-shi, Aichi-ken (JP)

(72) Inventors: Yoshio Hasegawa, Chiryu (JP); Masakazu Owatari, Nagakute (JP); Norihiro Tsukamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 15/491,221

(22) Filed: Apr. 19, 2017

(65) Prior Publication Data

US 2017/0314648 A1 Nov. 2, 2017

(30) Foreign Application Priority Data

Apr. 27, 2016 (JP) ................. 2016-089013

(51) Int. Cl.
*F16H 3/66* (2006.01)
*F16H 61/02* (2006.01)

(52) U.S. Cl.
CPC .......... *F16H 3/663* (2013.01); *F16H 61/0204* (2013.01); *F16H 61/0213* (2013.01); *F16H 2200/0069* (2013.01); *F16H 2200/201* (2013.01); *F16H 2200/2012* (2013.01); *F16H 2200/2023* (2013.01);
(Continued)

(58) Field of Classification Search
CPC ... F16H 3/663; F16H 3/62; F16H 3/66; F16H 61/02; F16H 61/04; F16H 61/686; F16H 2061/0444; F16H 2200/0069; F16H 2200/201; F16H 2200/2023; F16H 2200/2046; F16H 61/0204; F16H 61/0213; F16H 2306/14; F16H 2200/2097; F16H 2200/2012
USPC ........................................ 475/154, 276, 280
See application file for complete search history.

(56) References Cited

U.S. PATENT DOCUMENTS

2011/0125375 A1* 5/2011 Tokura ................ F16H 61/0437
701/51
2012/0004067 A1* 1/2012 Aota ....................... F16H 3/666
475/275
(Continued)

FOREIGN PATENT DOCUMENTS

| JP | 2014-202248 A | 10/2014 |
|---|---|---|
| JP | 2014-202249 A | 10/2014 |
| JP | 2015-124839 A | 7/2015 |

*Primary Examiner* — Jeffrey A Shapiro
(74) *Attorney, Agent, or Firm* — Oliff PLC

(57) ABSTRACT

An automatic transmission, which is configured such that there is no difference of rotation between a third sun gear and an intermediate shaft in a state where a second clutch is brought into a release state and a seventh speed stage is established, is provided. In the automatic transmission, at the time of a gear shift from a tenth speed stage where second and third clutches and a first brake are brought into an engagement state to a seventh speed stage where first, third, and fourth clutches are brought into an engagement state, the fourth clutch is engaged and the first brake is released to establish the seventh speed stage with the second clutch in the engagement state. Then, the first clutch is engaged and the second clutch is released to make transition to the seventh speed stage with the second clutch in the release state.

6 Claims, 8 Drawing Sheets

(52) U.S. Cl.
CPC .............. *F16H 2200/2046* (2013.01); *F16H 2200/2097* (2013.01); *F16H 2306/14* (2013.01)

(56) References Cited

U.S. PATENT DOCUMENTS

| | | | | |
|---|---|---|---|---|
| 2012/0088621 | A1* | 4/2012 | Kasuya | B60K 6/387 |
| | | | | 475/5 |
| 2013/0073154 | A1* | 3/2013 | Tanaka | F16D 48/06 |
| | | | | 701/54 |
| 2013/0226416 | A1* | 8/2013 | Seipold | F16H 47/04 |
| | | | | 701/55 |
| 2014/0284166 | A1* | 9/2014 | Ege | F16H 3/083 |
| | | | | 192/69.5 |
| 2014/0299432 | A1* | 10/2014 | Oita | F16H 3/66 |
| | | | | 192/3.27 |
| 2014/0302962 | A1 | 10/2014 | Kameda et al. | |
| 2014/0303858 | A1 | 10/2014 | Kameda et al. | |
| 2014/0329633 | A1* | 11/2014 | Borntraeger | F16H 1/28 |
| | | | | 475/207 |
| 2015/0031495 | A1* | 1/2015 | Beck | F16H 3/66 |
| | | | | 475/277 |
| 2015/0151627 | A1* | 6/2015 | Kato | B60W 20/10 |
| | | | | 475/5 |
| 2015/0175164 | A1* | 6/2015 | Kohlbock | B60W 10/08 |
| | | | | 477/20 |
| 2015/0260280 | A1* | 9/2015 | Masunaga | F16H 61/061 |
| | | | | 701/51 |
| 2015/0307101 | A1* | 10/2015 | Ries | F16H 61/16 |
| | | | | 192/219 |
| 2015/0323045 | A1* | 11/2015 | Beck | F16H 3/66 |
| | | | | 475/277 |
| 2016/0091062 | A1* | 3/2016 | Wys | F16H 3/727 |
| | | | | 475/5 |
| 2016/0178034 | A1* | 6/2016 | Beck | F16H 3/66 |
| | | | | 475/275 |
| 2016/0252164 | A1* | 9/2016 | Murakami | F16H 57/021 |
| | | | | 475/275 |
| 2016/0290443 | A1 | 10/2016 | Kutsubo et al. | |
| 2017/0152916 | A1* | 6/2017 | Schepperle | F16H 61/688 |
| 2018/0037104 | A1* | 2/2018 | Ai | F16H 3/12 |

* cited by examiner

FIG. 2

|  | C1 | C2 | C3 | C4 | B1 | B2 |
|---|---|---|---|---|---|---|
| Rev |  | ○ | ○ |  |  | ○ |
| P,N |  | ○ |  |  |  | ○ |
| 1st | ○ | ○ |  |  |  | ○ |
| 2nd | ○ |  |  |  | ○ | ○ |
| 3rd |  | ○ |  |  | ○ | ○ |
| 4th |  |  |  | ○ | ○ | ○ |
| 5th |  | ○ |  | ○ | ○ |  |
| 6th | ○ |  |  | ○ | ○ |  |
| 7th | ○ | (○) | ○ | ○ |  |  |
| 8th |  |  | ○ | ○ | ○ |  |
| 9th | ○ |  | ○ |  | ○ |  |
| 10th |  | ○ | ○ |  | ○ |  |

CONTROL DEVICE FOR AUTOMATIC TRANSMISSION

CROSS-REFERENCE TO RELATED APPLICATIONS

This application claims priority to Japanese Patent Application No. 2016-089013 filed on Apr. 27, 2016, the entire contents of which are hereby incorporated by reference.

BACKGROUND

1. Technical Field

The present disclosure relates to a control device which is applied to an automatic transmission capable of establishing one gear shift stage among a plurality of gear shift stages by individually switching a plurality of frictional engagement elements between an engagement state and a release state.

2. Description of Related Art

Hitherto, an automatic transmission is known which includes a plurality of frictional engagement elements capable of, on a power transmission path, switching between an engagement state where a pair of rotating elements is coupled and a release state where the rotating elements are decoupled, and is configured to switch a gear shift stage by individually switching the frictional engagement elements between the engagement state and the release state.

Japanese Patent Application Publication No. 2014-202249 (JP 2014-202249 A) discloses an automatic transmission including a frictional engagement element which is engaged to establish a predetermined gear shift stage, for example, a fifth speed stage (in JP 2014-202249 A, referred to as a specific gear shift stage) and a frictional engagement element (hereinafter, referred to as an additional frictional engagement element) which is configured such that, even if the additional frictional engagement element is further engaged in a state where the specific gear shift stage is established, the gear shift stage (gear ratio) is not changed. With this, a gear shift operation from a gear shift stage (a gear shift stage other than the specific gear shift stage) where the additional frictional engagement element is engaged to the specific gear shift stage and a gear shift operation from the specific gear shift stage to the gear shift stage (the gear shift stage other than the specific gear shift stage) where the additional frictional engagement element is engaged, the additional frictional engagement element is made to be engaged in the specific gear shift stage. As a result, switching of the addition frictional engagement element is not required. With this, it is possible to reduce the number of frictional engagement elements to be switched.

SUMMARY

However, in a control device for an automatic transmission of JP 2014-202249 A, a pair of rotating elements which is switched between a coupled state and a decoupled state by the additional frictional engagement element has a difference of rotation in the decoupled state (the release state of the additional frictional engagement element). That is, in a case of engaging the additional frictional engagement element in order to couple the pair of rotating elements while maintaining the specific gear shift stage or in a case of releasing the additional frictional engagement element in order to decouple the pair of rotating elements, the rotation speeds of the rotating elements change with change in engagement force of the additional frictional engagement element. For this reason, in a case where the difference of rotation of the pair of rotating elements in the decoupled state is large, considering the durability or the like of the additional frictional engagement element, coupling or decoupling of the pair of rotating elements may be limited. As a result, a gear shift pattern in which the number of frictional engagement elements to be switched can be reduced with the use of the additional frictional engagement element is limited, That is, in a case where the difference of rotation of the pair of rotating elements in the decoupled state is large, a gear shift operation using the additional frictional engagement element becomes impossible, and an applicable range of the above-described technique (the gear shift operation using the additional frictional engagement element) is restricted.

The present disclosure has been accomplished in consideration of such a point, and provides a control device for an automatic transmission capable of expanding a gear shift pattern in which the number of frictional engagement elements to be switched can be reduced.

According to an aspect of the present disclosure, there is provided an automatic transmission including a plurality of frictional engagement elements and an electronic control unit. The plurality of frictional engagement elements include a clutch mechanism, and the plurality of frictional engagement elements are configured to switch between an engagement state where a pair of rotating elements is coupled and a release state where the rotating elements are decoupled. The electronic control unit is configured to: (i) establish one gear shift stage among a plurality of gear shift stages of the automatic transmission by individually switching the plurality of frictional engagement elements between the engagement state and the release state, (ii) set at least one gear shift stage among the plurality of gear shift stages as a specific gear shift stage, the specific gear shift stage being a gear shift stage where, in a state where a predetermined frictional engagement element is brought into the engagement state and the gear shift stage is established, there is a pair of synchronous rotating elements as a pair of rotating elements having no difference of rotation in a state of being decoupled by a specific clutch mechanism in the release state, and (iii) make an gear shift operation pass through a state where the pair of synchronous rotating elements is coupled by bringing the specific clutch mechanism into the engagement state and the specific gear shift stage is established, when the specific gear shift stage is included as a gear shift stage from a gear shift stage at time of a start of the gear shift operation of the automatic transmission to a gear shift stage at a time of an end of the gear shift operation.

In the automatic transmission described above, with the specified matter, when the specific gear shift stage is included as a gear shift stage from the gear shift stage at the time of the start of the gear shift operation of the automatic transmission to the gear shift stage at the time of the end of the gear shift operation, the gear shift operation is made to pass through a state where the pair of synchronous rotating elements is coupled by bringing the specific clutch mechanism into the engagement state and the specific gear shift stage is established.

For example, at the time of a gear shift from a gear shift stage other than the specific gear shift stage to the specific gear shift stage, when the gear shift stage other than the specific gear shift stage is established by coupling the pair of synchronous rotating elements, the specific gear shift stage where the pair of synchronous rotating elements is coupled is established. With this, in establishing the specific gear shift stage, switching of a clutch mechanism (the specific clutch mechanism) for coupling the pair of synchronous rotating elements is not required. For this reason, it is possible to reduce the number of frictional engagement elements to be switched. After the specific gear shift stage is established in this way, the specific clutch mechanism is brought into the release state to decouple the pair of synchronous rotating elements and the specific gear shift stage is established (maintained). At the time of a gear shift from the specific gear shift stage to a gear shift stage other than the specific gear shift stage, when the gear shift stage other than the specific gear shift stage is established by coupling the pair of synchronous rotating elements, the specific gear shift stage where the pair of synchronous rotating elements is coupled is established in advance. Even with this, in establishing the gear shift stage other than the specific gear shift stage, switching of the clutch mechanism (the specific clutch mechanism) for coupling the pair of synchronous rotating elements is not required. For this reason, it is possible to reduce the number of frictional engagement elements to be switched. In this case, transition is made in advance from a state where the specific clutch mechanism is brought into the release state to decouple the pair of synchronous rotating elements and the specific gear shift stage is established to a state where the specific clutch mechanism is brought into the engagement state to couple the pair of synchronous rotating elements and the specific gear shift stage is established.

In the gear shift operation, when transition is made from a state where the specific clutch mechanism is brought into the engagement state to couple the pair of synchronous rotating elements and the specific gear shift stage is established to a state where the specific clutch mechanism is brought into the release state to decouple the pair of synchronous rotating elements and the specific gear shift stage is established or when transition is made from a state where the specific clutch mechanism is brought into the release state to decouple the pair of synchronous rotating elements and the specific gear shift stage is established to a state where the specific clutch mechanism is brought into the engagement state to couple the pair of synchronous rotating elements and the specific gear shift stage is established, since the pair of synchronous rotating elements has no difference of rotation in a state of being decoupled, the rotation speeds of the rotating elements are not changed with change in engagement force of the specific clutch mechanism. That is, the durability or the like of the frictional engagement element (the specific clutch mechanism) is not adversely affected. For this reason, coupling or decoupling of the pair of rotating elements is not limited. Accordingly, a gear shift pattern in which the number of frictional engagement elements to be switched can be reduced with the use of the specific clutch mechanism described above is not limited, and it is possible to achieve expansion of the application range of the gear shift operation using the specific clutch mechanism.

In the above-described automatic transmission, each gear shift stage may be established by bringing three frictional engagement elements among the plurality of frictional engagement elements into the engagement state. The specific gear shift stage may be established by bringing at least three frictional engagement elements among four frictional engagement elements including the specific clutch mechanism into the engagement state and bringing other frictional engagement elements into the release state.

According to the automatic transmission described above, it is possible to make any frictional engagement element among the four frictional engagement elements function as the specific clutch mechanism, and it is possible to perform a gear shift in a gear shift pattern in which a state where the frictional engagement element functioning as the specific clutch mechanism is brought into the engagement state to couple the pair of synchronous rotating elements corresponding to the frictional engagement element and the specific gear shift stage is established. For this reason, it is possible to achieve further expansion of the application range of the gear shift operation using the specific clutch mechanism.

In the above-described automatic transmission, when the gear shift stage at the time of the start of the gear shift operation is a gear shift stage which is different from the specific gear shift stage and is established when the specific clutch mechanism is brought into the engagement state and the pair of synchronous rotating elements is coupled, and the gear shift stage at the time of the end of the gear shift operation is the specific gear shift stage, the electronic control unit may be configured to: (i) individually switch other frictional engagement elements between the engagement state and the release state such that the specific gear shift stage is established while maintaining the engagement state of the specific clutch mechanism so as to maintain a coupled state of the pair of synchronous rotating elements, in a gear shift operation from the gear shift stage at the time of the start of the gear shift operation to the specific gear shift stage, and (ii) bring other frictional engagement elements into the engagement state such that the specific gear shift stage is established in a state where the specific clutch mechanism is brought into the release state and the pair of synchronous rotating elements is decoupled, after individually switching other frictional engagement elements between the engagement state and the release state.

According to the automatic transmission described above, at the time when other frictional engagement elements are individually switched between the engagement state and the release state such that the specific gear shift stage is established while maintaining the engagement state of the specific clutch mechanism so as to maintain the coupled state of the pair of synchronous rotating elements, the target gear shift stage (the specific gear shift stage as the gear shift stage at the time of the end of the gear shift operation) is obtained. For this reason, it is possible to reduce the time until the specific gear shift stage is established. For example, when a gear shift operation (so-called, a skip gear shift operation) to a discontinuous gear shift stage is requested, it is possible to reduce the time until the target gear shift stage (specific gear shift stage) is established. Furthermore, since another gear shift stage is not provided between the gear shift stage at the time of the start of the gear shift operation and the gear shift stage at the time of the end of the gear shift operation, the gear shift operation is smooth. Furthermore, after the specific gear shift stage (the specific gear shift stage while maintaining the engagement state of the specific clutch mechanism) is established, the specific gear shift stage is established in a state where the specific clutch mechanism is brought into the release state and other frictional engagement elements are brought into the engagement state to decouple the pair of synchronous rotating elements; however, since the gear shift stage is not changed in this operation, shock due to this operation does not occur. In addition, as described above, since the pair of synchronous rotating elements has no difference of rotation in a state of being decoupled, the release operation of the specific clutch mechanism is performed without adversely affecting the durability or the like of the specific clutch mechanism. For example, this operation becomes an operation in consideration of the clutch mechanism to be in the release state and the frictional engagement element to be in the engagement state in the next gear shift operation, making it possible to smoothly perform the next gear shift operation.

In the above-described automatic transmission, when the gear shift stage at the time of the start of the gear shift operation is the specific gear shift stage, and the gear shift stage at the time of the end of the gear shift operation is a gear shift stage which is different from the specific gear shift stage and is established when the specific clutch mechanism is brought into the engagement state and the pair of synchronous rotating elements is coupled, the electronic control unit may be configured to: (i) bring a state of the automatic transmission from a state where the specific clutch mechanism is brought into the release state to decouple the pair of synchronous rotating elements and the specific gear shift stage is established to a state where the specific clutch mechanism is brought into the engagement state to couple the pair of synchronous rotating elements and the specific gear shift stage is established, in a gear shift operation from the specific gear shift stage to the gear shift stage at the time of the end of the gear shift operation, and (ii) individually switch other frictional engagement elements between the engagement state and the release state such that the gear shift stage at the time of the end of the gear shift operation is established while maintaining the engagement state of the specific clutch mechanism so as to maintain a coupled state of the pair of synchronous rotating elements, after a state where the specific gear shift stage is established is brought.

According to the automatic transmission described above, other frictional engagement elements are individually switched between the engagement state and the release state such that the gear shift stage at the time of the end of the gear shift operation is established while maintaining the engagement state of the specific clutch mechanism so as to maintain the coupled state of the pair of synchronous rotating elements, whereby the target gear shift stage (the gear shift stage at the time of the end of the gear shift operation) is obtained. For this reason, even if a gear shift between the gear shift stage (specific gear shift stage) at the time of the start of the gear shift operation and the gear shift stage at the time of the end of the gear shift operation is a skip gear shift, it is possible to reduce the number of frictional engagement elements which are switched between the engagement state and the release state (for example, only a pair of frictional engagement elements is switched), and to suppress gear shift shock. Furthermore, as described above, since a pair of synchronous rotating elements has no difference of rotation in a state of being decoupled, the engagement operation of the specific clutch mechanism is performed without adversely affecting the durability or the like of the specific clutch mechanism. In addition, since another gear shift stage is not provided between the gear shift stage at the time of the start of the gear shift operation and the gear shift stage at the time of the end of the gear shift operation, the gear shift operation is performed smoothly.

In the above-described automatic transmission, when both of the gear shift stage at the time of the start of the gear shift operation and the gear shift stage at the time of the end of the gear shift operation are gear shift stages which are different from the specific gear shift stage and which are established when the specific clutch mechanism is brought into the engagement state and the pair of synchronous rotating elements is coupled, the electronic control unit may be configured to: (i) individually switch other frictional engagement elements between the engagement state and the release state such that the specific gear shift stage is established while maintaining the engagement state of the specific clutch mechanism so as to maintain a coupled state of the pair of synchronous rotating elements, in a gear shift operation from the gear shift stage at the time of the start of the gear shift operation to the gear shift stage at the time of the end of the gear shift operation, and (ii) individually switch other frictional engagement elements between the engagement state and the release state such that the gear shift stage at the time of the end of the gear shift operation is established while maintaining the engagement state of the specific clutch mechanism so as to maintain the coupled state of the pair of synchronous rotating elements, after individually switching other frictional engagement elements between the engagement state and the release state.

According to the automatic transmission described above, the specific gear shift stage is provided in the gear shift operation from the gear shift stage at the time of the start of the gear shift operation and the gear shift stage at the time of the end of the gear shift operation, whereby it is possible to reduce the number of frictional engagement elements which are switched between the engagement state and the release state in each of the gear shift operation from the gear shift stage at the time of the start of the gear shift operation to the specific gear shift stage and the gear shift operation from the specific gear shift stage to the gear shift stage at the time of the end of the gear shift operation, and to suppress gear shift shock.

In the above-described automatic transmission, (i) a shift gear mechanism in the automatic transmission may include a first planetary gear mechanism, a second planetary gear mechanism, and a Ravigneaux planetary gear mechanism with a third planetary gear mechanism and a fourth planetary gear mechanism combined, (ii) a first carrier of the first planetary gear mechanism and a third carrier of the Ravigneaux planetary gear mechanism may be coupled to an input shaft, (iii) a second carrier of the second planetary gear mechanism may be coupled to an output shaft, (iv) a first sun gear of the first planetary gear mechanism and a second sun gear of the second planetary gear mechanism may be coupled integrally to an intermediate shaft, (v) a first clutch may be provided between the intermediate shaft and a third ring gear of the Ravigneaux planetary gear mechanism, (vi) a second clutch may be provided between the intermediate shaft and a third sun gear of the third planetary gear mechanism of the Ravigneaux planetary gear mechanism, (vii) a third clutch may be provided between a second ring gear of the second planetary gear mechanism and the third ring gear of the Ravigneaux planetary gear mechanism, (viii) a fourth clutch may be provided between a first ring gear of the first planetary gear mechanism and the output shaft, (ix) a fourth sun gear of the fourth planetary gear mechanism of the Ravigneaux planetary gear mechanism may be coupled to a first brake, (x) the second ring gear may be coupled to a second brake, (xi) the electronic control unit may be configured to switch forward 10-speed stages and a reverse 1-speed stage by bringing the first clutch, the second clutch, the third clutch, the fourth clutch, the first brake, and the second brake into an engagement state or a release state, and (xii) the specific clutch mechanism may be the second clutch, and the pair of synchronous rotating elements may be the third sun gear and the intermediate shaft, when the first clutch, the third clutch, and the fourth clutch are respectively in the engagement state, the second clutch, the first brake, and the second brake are respectively in the release state, and a forward seventh speed stage as the specific gear shift stage is established.

According to the automatic transmission described above, at each time of a gear shift from a gear shift stage (a gear shift stage which is established by bringing the second clutch into the engagement state) other than the forward seventh speed stage to the forward seventh speed stage, a gear shift from the forward seventh speed stage to a gear shift stage (a gear shift stage which is established by bringing the second clutch into the engagement state) other than the forward seventh speed stage, and a gear shift to make the gear shift operation pass through the forward seventh speed stage halfway, it is possible to embody a shift gear mechanism capable of making the gear shift operation pass through a state where the second clutch (specific clutch mechanism) is brought into the engagement state to couple the third sun gear and the intermediate shaft as the pair of synchronous rotating elements and the forward seventh speed stage is established.

In the present disclosure, in regard to an automatic transmission which has a specific gear shift stage where there is a pair of synchronous rotating elements as a pair of rotating elements having no difference of rotation in a state of being decoupled, when the specific gear shift stage is included as a gear shift stage from a gear shift stage at the time of the start of a gear shift operation to a gear shift stage at the time of the end of the gear shift operation, the gear shift operation is made to pass through a state where a pair of synchronous rotating elements is coupled and the specific gear shift stage is established. With this, it is possible to reduce the number of frictional engagement elements to be switched with the use of the specific clutch mechanism, to prevent a gear shift pattern from being limited, and to achieve expansion of the application range of a gear shift operation using a specific clutch mechanism.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is an engagement table showing the relationship between each gear shift stage of the automatic transmission shown in FIG. 1 and an operation state of each frictional engagement element;

DETAILED DESCRIPTION OF EMBODIMENTS

Figure 1:
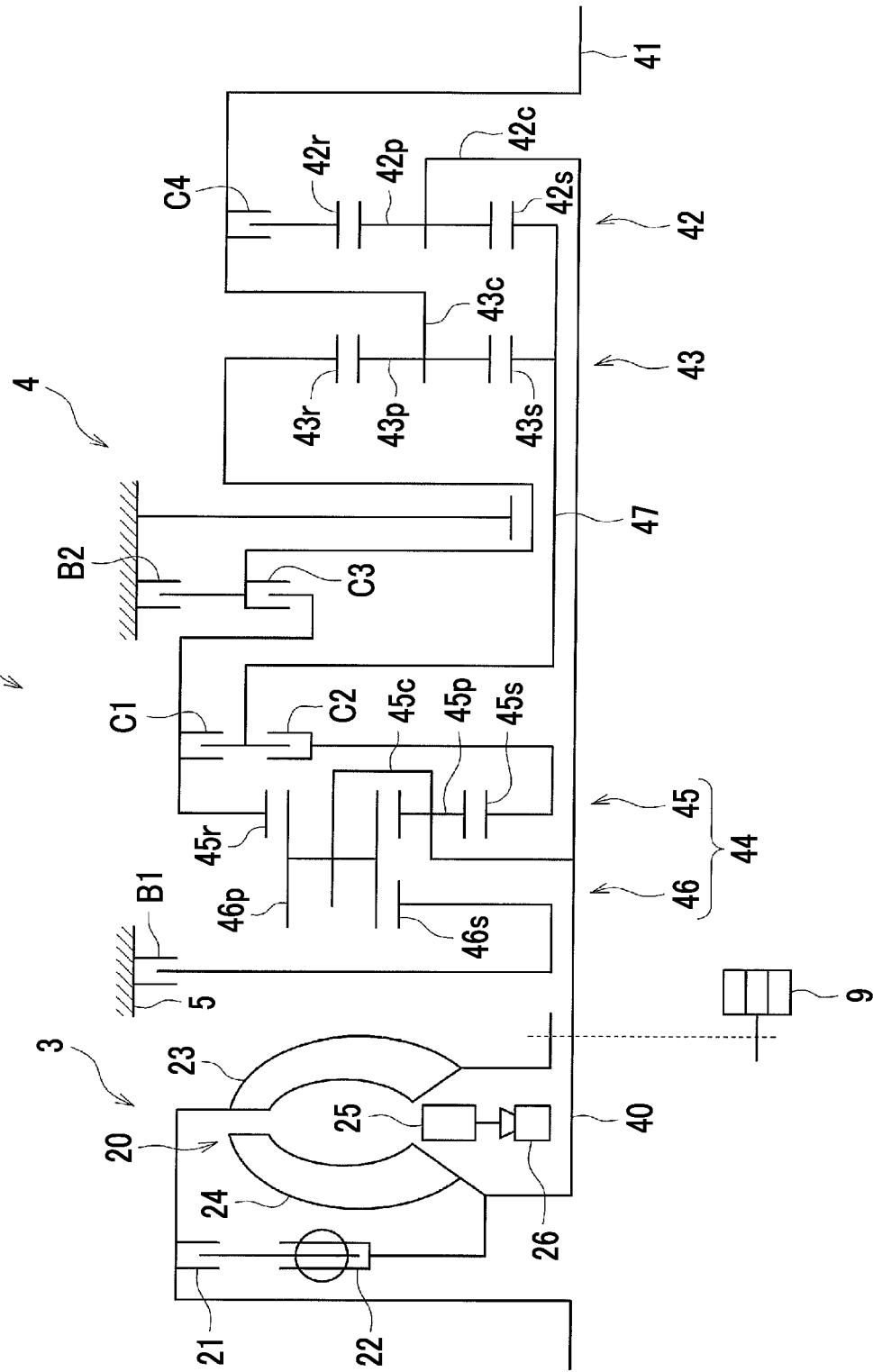
FIG. 1 is a schematic view showing an entire power transmission device to which a control device for an automatic transmission according to an embodiment of the present disclosure is applied.

Hereinafter, an embodiment of the present disclosure will be described referring to the drawings. In this embodiment, a case where the present disclosure is applied to a front engine-rear drive (FR) vehicle with an automatic transmission capable of performing a forward 10-speed gear shift mounted therein will be described.

First, the schematic configuration of a power transmission device to which the automatic transmission according to this embodiment is applied will be described referring to the drawings. FIG. 1 is a schematic view showing an entire power transmission device 10.

The power transmission device 10 is coupled to a crank shaft of an engine (internal combustion engine) (not shown) and is configured to transmit power (torque) from the engine to right and left wheels (drive wheels). The power transmission device 10 includes a starting device (fluid coupling) 3, an oil pump 9, an automatic transmission 4 which shifts power transmitted from the engine to an input shaft 40 (shifts a rotation speed) and transmits power to an output shaft 41, and a transmission case 5 which houses these.

The starting device 3 includes a torque converter 20, a lockup clutch 21, and a damper mechanism 22. The torque converter 20 includes an input-side pump impeller 23, an output-side turbine runner 24 coupled to the input shaft 40 of the automatic transmission 4, a stator 25, and a one-way clutch 26.

Figure 4:
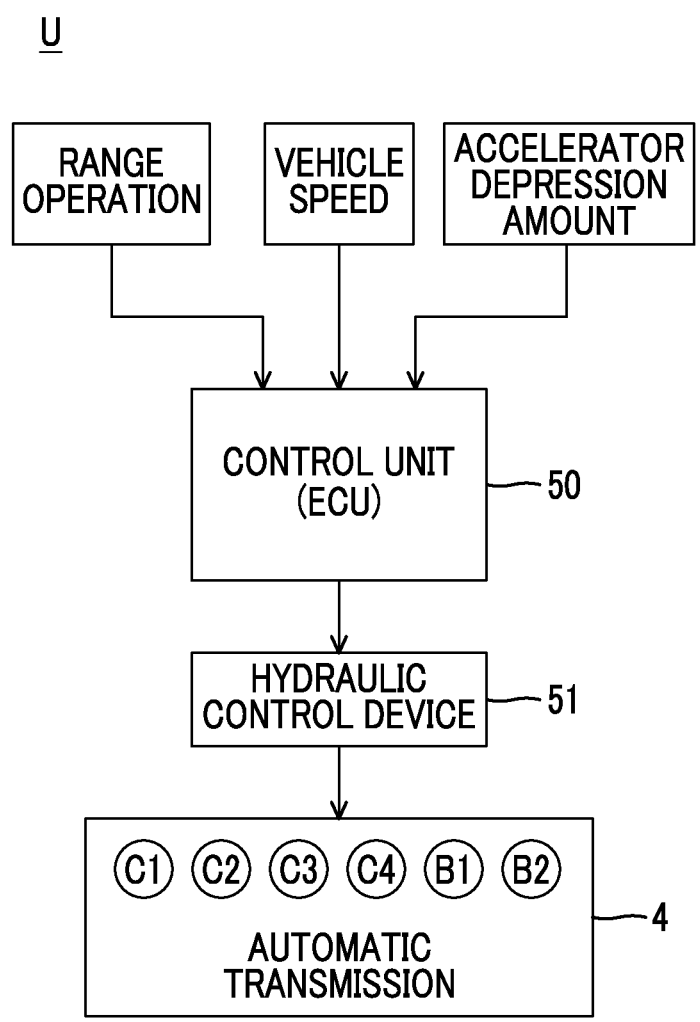
FIG. 4 is a block diagram showing a control system of the automatic transmission.

The oil pump 9 is operated with power from the engine and is configured to suction hydraulic oil (ATF) stored in an oil pan (not shown) and to pump hydraulic oil to a hydraulic control device 51 (see FIG. 4).

The automatic transmission 4 is constituted as a 10-speed transmission. The automatic transmission 4 includes a shift gear mechanism having the input shaft 40, the output shaft 41, a single-pinion type first planetary gear mechanism 42, a single-pinion type second planetary gear mechanism 43, and a Ravigneaux planetary gear mechanism 44. The output shaft 41 is coupled to rear right and left wheels through a differential gear set and a drive shaft (not shown). The first planetary gear mechanism 42 and the second planetary gear mechanism 43 are provided along the axial directions of the input shaft 40 and the output shaft 41. The shift gear mechanism is a composite planetary gear mechanism which is constituted by combining a double-pinion type third planetary gear mechanism 45 and a single-pinion type fourth planetary gear mechanism 46. The automatic transmission 4 includes a first clutch C1, a second clutch C2, a third clutch C3, a fourth clutch C4, a first brake B1, and a second brake B2 as six frictional engagement elements for changing a power transmission path from the input shaft 40 to the output shaft 41. These frictional engagement elements are switchable between an engagement state where a pair of rotating elements among the rotating elements constituting the shift gear mechanism of the automatic transmission 4 is coupled and a release state where the rotating element are decoupled.

In this embodiment, the first and second planetary gear mechanisms 42, 43 and the Ravigneaux planetary gear mechanism 44 are provided in the transmission case 5 such that the Ravigneaux planetary gear mechanism 44, the second planetary gear mechanism 43, and the first planetary gear mechanism 42 are arranged in this order from the starting device 3 side (the left side in FIG. 1).

The first planetary gear mechanism 42 includes a first sun gear 42s which is an external gear, a first ring gear 42r which is an internal gear and is provided concentrically with the first sun gear 42s, a plurality of first pinions 42p which respectively mesh with the first sun gear 42s and the first ring gear 42r, and first carrier 42c which rotatably holds a plurality of first pinions 42p.

The first carrier 42e of the first planetary gear mechanism 42 is constantly coupled to the input shaft 40. With this, when power is transmitted from the engine to the input shaft 40, power from the engine is constantly transmitted to the first carrier 42c through the input shaft 40. The first carrier 42c functions as an input element of the first planetary gear mechanism 42, and the first ring gear 42r functions as an output element of the first planetary gear mechanism 42 at the time of engagement of the fourth clutch C4.

The second planetary gear mechanism 43 includes a second sun gear 43s which is an external gear, a second ring gear 43r which is an external gear and is provided concentrically with the second sun gear 43s, a plurality of second pinions 43p which respectively mesh with the second sun gear 43s and the second ring gear 43r, and a second carrier 43c which rotatably holds a plurality of second pinions 43p.

The second sun gear 43s of the second planetary gear mechanism 43 is integrated with (constantly coupled to) the first sun gear 42s of the first planetary gear mechanism 42 and is configured to rotate or stop constantly integrally (and concentrically) with the first sun gear 42s. The second carrier 43c of the second planetary gear mechanism 43 is constantly coupled to the output shaft 41 and is configured to rotate or stop constantly integrally (and concentrically) with the output shaft 41. With this, the second carrier 43c functions as an output element of the second planetary gear mechanism 43. In addition, the second ring gear 43r of the second planetary gear mechanism 43 is fixable by the second brake B2 and functions as a fixable element of the second planetary gear mechanism 43.

The Ravigneaux planetary gear mechanism 44 includes a third sun gear 45s and a fourth sun gear 46s which are external gears, a third ring gear 45r which is an internal gear and is provided concentrically with the third and fourth sun gears 45s, 46s, a plurality of third pinions (short pinions) 45p which mesh with the third sun gear 45s, a plurality of fourth pinions (long pinions) 46p which mesh with the fourth sun gear 46s and a plurality of third pinions 45p and mesh with the third ring gear 45r, and a third carrier 45c which rotatably holds a plurality of third pinions 45p and a plurality of fourth pinions 46p.

The third planetary gear mechanism 45 is constituted of the third sun gear 45s, the third carrier 45c, the third pinions 45p, the fourth pinions 46p, and the third ring gear 45r. The fourth planetary gear mechanism 46 is constituted of the fourth sun gear 46s, the third carrier 45c, the fourth pinions 46p, and the third ring gear 45r.

Of the rotating elements constituting the Ravigneaux planetary gear mechanism 44, the fourth sun gear 46s is fixable by the first brake B1 and functions as a fixable element of the Ravigneaux planetary gear mechanism 44. In addition, the third carrier 45c is constantly coupled to the input shaft 40 and is constantly coupled to the first carrier 42c of the first planetary gear mechanism 42. With this, when power is transmitted from the engine to the input shaft 40, power from the engine is constantly transmitted to the third carrier 45c through the input shaft 40. Accordingly, the third carrier 45c functions as an input element of the Ravigneaux planetary gear mechanism 44. The third ring gear 45r is couplable to the sun gear 43s of the second planetary gear mechanism 43 and the sun gear 42s of the first planetary gear mechanism 42 through the first clutch C1 and the intermediate shaft 47. Furthermore, the third ring gear 45r is couplable to the ring gear 43r of the second planetary gear mechanism 43 through the third clutch C3 and functions as a first output element of the Ravigneaux planetary gear mechanism 44. The third sun gear 45s is couplable to the sun gear 43s of the second planetary gear mechanism 43 and the sun gear 42s of the first planetary gear mechanism 42 through the second clutch C2 and the intermediate shaft 47 and functions as a second output element of the Ravigneaux planetary gear mechanism 44.

The first clutch C1 is switchable between the engagement state and the release state, is brought into the engagement state to couple the intermediate shaft 47 (the first sun gear 42s of the first planetary gear mechanism 42 and the second sun gear 43s of the second planetary gear mechanism 43) and the third ring gear 45r of the Ravigneaux planetary gear mechanism 44, and is brought into the release state to decouple the intermediate shaft 47 and the third ring gear 45r of the Ravigneaux planetary gear mechanism 44. The second clutch C2 is switchable between the engagement state and the release state, and is brought into the engagement state to couple the intermediate shaft 47 (the first sun gear 42s of the first planetary gear mechanism 42 and the second sun gear 43s of the second planetary gear mechanism 43) and the third sun gear 45s of the Ravigneaux planetary gear mechanism 44. Then, the second clutch C2 is brought into the release state to decouple the intermediate shaft 47 and the third sun gear 45s of the Ravigneaux planetary gear mechanism 44. The third clutch C3 is switchable between the engagement state and the release state, and is brought into the engagement state to couple the second ring gear 43r of the second planetary gear mechanism 43 and the third ring gear 45r of the Ravigneaux planetary gear mechanism 44. Then, the third clutch C3 is brought into the release state to decouple the second ring gear 43r of the second planetary gear mechanism 43 and the third ring gear 45r of the Ravigneaux planetary gear mechanism 44. The fourth clutch C4 is switchable between the engagement state and the release state, is brought into the engagement state to couple the first ring gear 42r of the first planetary gear mechanism 42 and the output shaft 41, and is brought into the release state to decouple the first ring gear 42r of the first planetary gear mechanism 42 and the output shaft 41.

The first brake B1 is switchable between the engagement state and the release state, is brought into the engagement state to fix (connect) the fourth sun gear 46s of the Ravigneaux planetary gear mechanism 44 unrotatably with respect to the transmission case 5, and is brought into the release state to release the fourth sun gear 46s rotatably with respect to the transmission case. The second brake B2 is switchable between the engagement state and the release state, is brought into the engagement state to fix (connect) the second ring gear 43r of the second planetary gear mechanism 43 unrotatably with respect to the transmission case 5, and is brought into the release state to release the second ring gear 43r rotatably with respect to the transmission case.

In this embodiment, as the first clutch C1 to the fourth clutch C4, multi-plate friction hydraulic clutches which are constituted of a piston, a plurality of frictional engagement plates (for example, friction plates are constituted by bonding a friction material to both surfaces of an annular member and separator plates as annular members both surfaces of which are smooth), an engagement oil chamber and a centrifugal hydraulic cancel chamber to each of which hydraulic oil is supplied, and the like are employed. As the first brake B1 and the second brake B2, multi-plate frictional hydraulic brakes Which have a hydraulic servo constituted of a piston, a plurality of frictional engagement plates (friction plates and separator plates), an engagement oil chamber to which hydraulic oil is supplied, and the like are employed.

Figure 3:
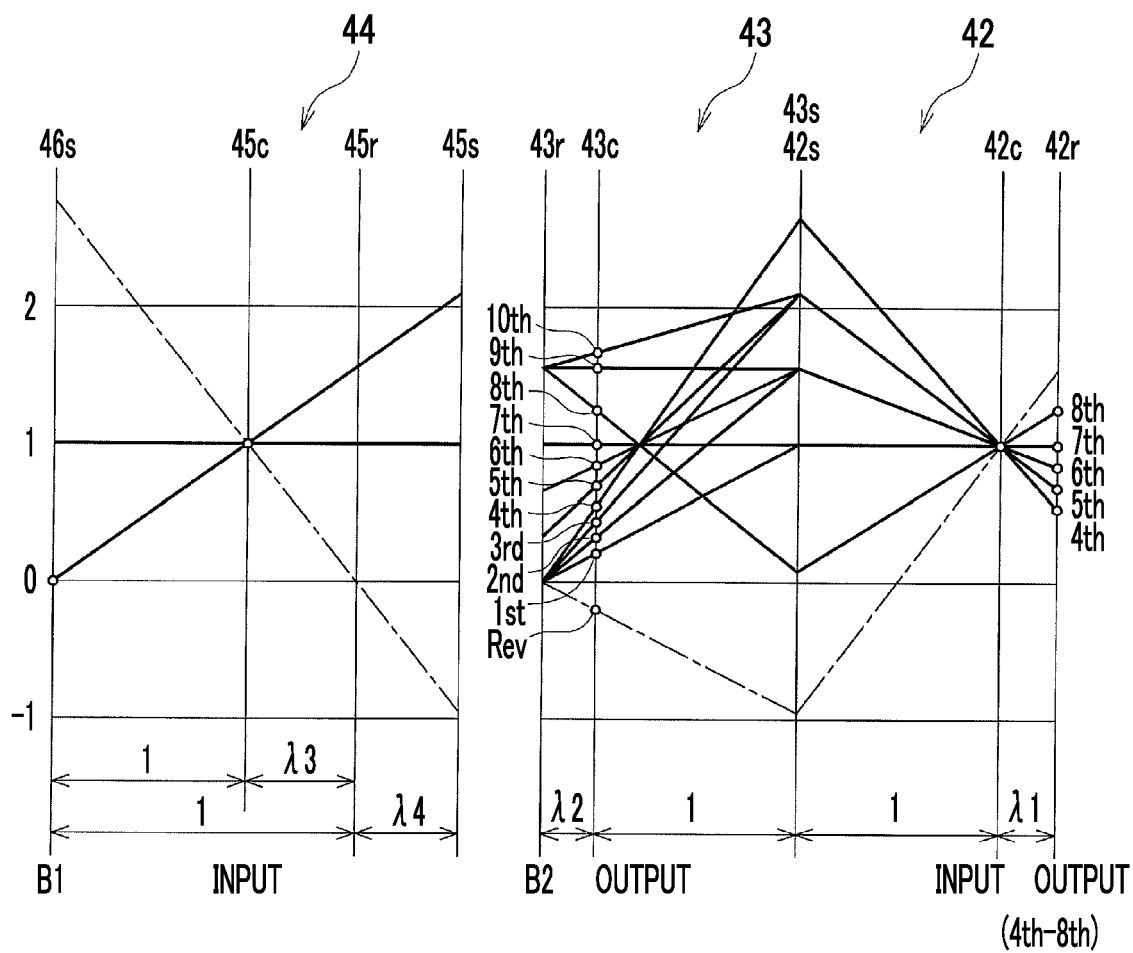
FIG. 3 is a collinear diagram showing the ratio of a rotation speed of each rotating element to a rotation speed of an input shaft in the automatic transmission.

FIG. 2 is an engagement table showing the relationship between each gear shift stage of the automatic transmission 4 and the operation states of the first clutch C1 to the fourth clutch C4, the first brake B1, and the second brake B2. FIG. 3 is a collinear diagram showing the ratio of the rotation speed of each rotating element to the rotation speed of the input shaft 40 in the automatic transmission 4 (however, the rotation speed of the input shaft 40, that is, the first carrier 42c and the third carrier 45c, is set to a value 1). In this way, one gear shift stage among a plurality of gear shift stages is established by individually switching the respective frictional engagement elements between the engagement state and the release state. Specifically, a forward stage and a reverse stage are established by bringing the three frictional engagement elements among a plurality of frictional engagement elements C1 to C4, B1, B2 into the engagement state.

As shown in FIG. 3, the three rotating elements (the first sun gear 42s, the first ring gear 42r, and the first carrier 42c) constituting the first planetary gear mechanism 42 are arranged in an order of the first sun gear 42s, the first carrier 42c, and the first ring gear 42r from the left side of the drawing at an interval according to a gear ratio $\lambda 1$ on a collinear diagram (a collinear diagram at the right end in FIG. 3) of the first planetary gear mechanism 42.

The three rotating elements (the second sun gear 43s, the second ring gear 43r, and the second carrier 43c) constituting the second planetary gear mechanism 43 are arranged in an order of the second sun gear 43s, the second carrier 43c, and the second ring gear 43r from the right side of the drawing at an interval according to a gear ratio $\lambda 2$ on a collinear diagram (a collinear diagram at the center in FIG. 3) of the second planetary gear mechanism 43.

In addition, the four rotating elements (the fourth sun gear 46s, the third carrier 45c, the third ring gear 45r, and the third sun gear 45s) constituting the Ravigneaux planetary gear mechanism 44 are arranged in this order from the left side of the drawing at an interval according to a gear ratio $\lambda 3$ of the fourth planetary gear mechanism 46 and a gear ratio $\lambda 4$ of the third planetary gear mechanism 45 on a collinear diagram (a collinear diagram on the left side in FIG. 3) of the Ravigneaux planetary gear mechanism 44.

As shown in FIG. 4 (a block diagram showing a control system of an automatic transmission), a control device U for an automatic transmission includes an electronic control unit (ECU) 50 which receives respective signals, such as a driver's range operation signal, a vehicle speed, and an accelerator pedal angle as a driver's torque request, as input and outputs control signals, and a hydraulic control device 51 which has multiple valves, such as linear solenoid valves.

The electronic control unit 50 determines a gear shift stage based on the respective signals described above and outputs signals of respective control hydraulic pressures PC1, PC2, PC3, PC4, PB1, PB2 to the respective linear solenoid valves of the hydraulic control device 51, and the hydraulic control device 51 outputs hydraulic pressures adjusted by the respective control hydraulic pressure signals to the hydraulic servos C1, C2, C3, C4, B1, B2 of the respective clutches and brakes of the automatic transmission 4.

In the automatic transmission 4 configured as above, the first clutch C1 to the fourth clutch C4, the first brake B1, and the second brake B2 are brought into the engagement state or the release state in the combinations shown in the engagement table of FIG. 2, whereby the forward first speed stage (1st) to the forward tenth speed stage (10th), and the reverse stage (Rev) are achieved at the ratio of the rotation speeds like the collinear diagram of FIG. 3.

The forward seventh speed stage (7th) is basically formed by engaging the first clutch C1, the third clutch C3, and the fourth clutch C4 and releasing the remaining second clutch C2, first brake B1, and second brake B2. That is, when forming the forward seventh speed stage (hereinafter, simply referred to as a seventh speed stage), the intermediate shaft 47 (the first sun gear 42s of the first planetary gear mechanism 42 and the second sun gear 43s of the second planetary gear mechanism 43) and the third ring gear 45r of the Ravigneaux planetary gear mechanism 44 are connected to each other by the first clutch C1, the second ring gear 43r of the second planetary gear mechanism 43 and the third ring gear 45r of the Ravigneaux planetary gear mechanism 44 are connected to each other by the third clutch C3, and in addition, the first ring gear 42r of the first planetary gear mechanism 42, the output shaft 41, and the second carrier 43c of the second planetary gear mechanism 43 are connected to one another by the fourth clutch C4. In this embodiment, a gear ratio $\gamma 7$ in the seventh speed stage becomes $\gamma 7=1,000$. For this reason, the seventh speed stage is established by engaging at least three clutches among the four first to fourth clutches C1 to C4 and bringing other frictional engagement elements into the release state. In this embodiment, considering that, in the sixth speed stage, the first clutch C1 is brought into the engagement state and it is possible to reduce the number of frictional engagement elements to be switched when a gear shift from the seventh speed stage to the sixth speed stage is performed and considering that, in the eighth speed stage, both of the third clutch C3 and the fourth clutch C4 are brought into the engagement state and it is possible to reduce the number of frictional engagement elements to be switched when a gear shift from the seventh speed stage to the eighth speed stage is performed, as described above, in the seventh speed stage, the first clutch C1, the third clutch C3, and the fourth clutch C4 are basically engaged.

In this case, the intermediate shaft 47 (the first sun gear 42s of the first planetary gear mechanism 42 and the second sun gear 43s of the second planetary gear mechanism 43) and the third sun gear 45s of the Ravigneaux planetary gear mechanism 44 have the same rotation speed. That is, although the second clutch C2 is brought into the release state, the intermediate shaft 47 (the first sun gear 42s of the first planetary gear mechanism 42 and the second sun gear 43s of the second planetary gear mechanism 43) and the third sun gear 45s which are coupled when the second clutch C2 is brought into the engagement state have the same rotation speed and have no difference of rotation. For this reason, in a state where the seventh speed stage is established, the second clutch C2 is an example of a specific clutch mechanism in the present disclosure. The intermediate shaft 47 (the first sun gear 42s of the first planetary gear mechanism 42 and the second sun gear 43s of the second planetary gear mechanism 43) and the third sun gear 45s are an example of a pair of synchronous rotating elements (a pair of synchronous rotating elements which is a pair of rotating elements having no difference of rotation in a state of being decoupled by a specific clutch mechanism in the release state) in the present disclosure. That is, in the automatic transmission 4, the seventh speed stage becomes a specific gear shift stage. The specific gear shift stage is one gear shift stage among a plurality of gear shift stages. The specific gear shift stage is a gear shift stage where there is a pair of synchronous rotating elements which is a pair of rotating elements having no difference of rotation in a state of being decoupled by a specific clutch mechanism in the release state in a state where a predetermined frictional engagement element is brought into the engagement state and the gear shift stage is established.

The term "specific clutch mechanism" in the present disclosure merely specifies an engagement element which is engaged or released with respect to "a pair of synchronous rotating elements" in the present disclosure, and does not necessarily specify a special mechanism. That is, a general frictional engagement element may be employed.

Next, a gear shift control operation as a feature of this embodiment will be described.

The gear shift control operation as the feature of this embodiment may include the specific gear shift stage (in this embodiment, the seventh speed stage) as a gear shift stage from a gear shift stage at the time of the start of the gear shift operation to a gear shift stage at the time of the end of the gear shift operation.

Specifically, the gear shift operation is made to pass through a state where the intermediate shaft 47 and the third sun gear 45s (a pair of synchronous rotating elements) are coupled by bringing the second clutch C2 (specific clutch mechanism) into the engagement state and the seventh speed stage (specific gear shift stage) is established. Then, as a gear shift pattern in which the intermediate shaft 47 and the third sun gear 45s (a pair of synchronous rotating elements) are coupled and the seventh speed stage (specific gear shift stage) is established, there are the following three patterns: (1) a case (hereinafter, referred to as a first gear shift pattern) where the gear shift stage at the time of the start of the gear shift operation is a gear shift stage which is different from the seventh speed stage (specific gear shift stage) and is established when the second clutch C2 (specific clutch mechanism) is brought into the engagement state and the intermediate shaft 47 and the third sun gear 45s (a pair of synchronous rotating elements) are coupled, and the gear shift stage at the time of the end of the gear shift operation is the seventh speed stage (specific gear shift stage), (2) a case (hereinafter, referred to as a second gear shift pattern) where the gear shift stage at the time of the start of the gear shift operation is the seventh speed stage (specific gear shift stage), and the gear shift stage at the time of the end of the gear shift operation is a gear shift stage which is different from the seventh speed stage (specific gear shift stage) and is established when the second clutch C2 (specific clutch mechanism) is brought into the engagement state and the intermediate shaft 47 and the third sun gear 45s (a pair of synchronous rotating elements) are coupled, and (3) a case (hereinafter, referred to as a third gear shift pattern) where both of the gear shift stage at the time of the start of the gear shift operation and the gear shift stage at the time of the end of the gear shift operation are gear shift stages which are different from the seventh speed stage (specific gear shift stage) and are established when the second clutch C2 (specific clutch mechanism) is brought into the engagement state and the intermediate shaft 47 and the third sun gear 45s (a pair of synchronous rotating elements) are coupled. For ease of understanding of the gear shift control operation according to this embodiment, a specific example of the gear shift operation in each gear shift pattern described above will be described.

First, the first gear shift pattern will be described. As the above-described first gear shift pattern, a case of a gear shift from the tenth speed stage to the seventh speed stage will be described. For example, a case where a skip gear shift to the seventh speed stage is requested by a power-on down-shift during traveling in the tenth speed stage or a case where a skip gear shift to the seventh speed stage is requested by a driver's shift operation is exemplified.

Figure 5:
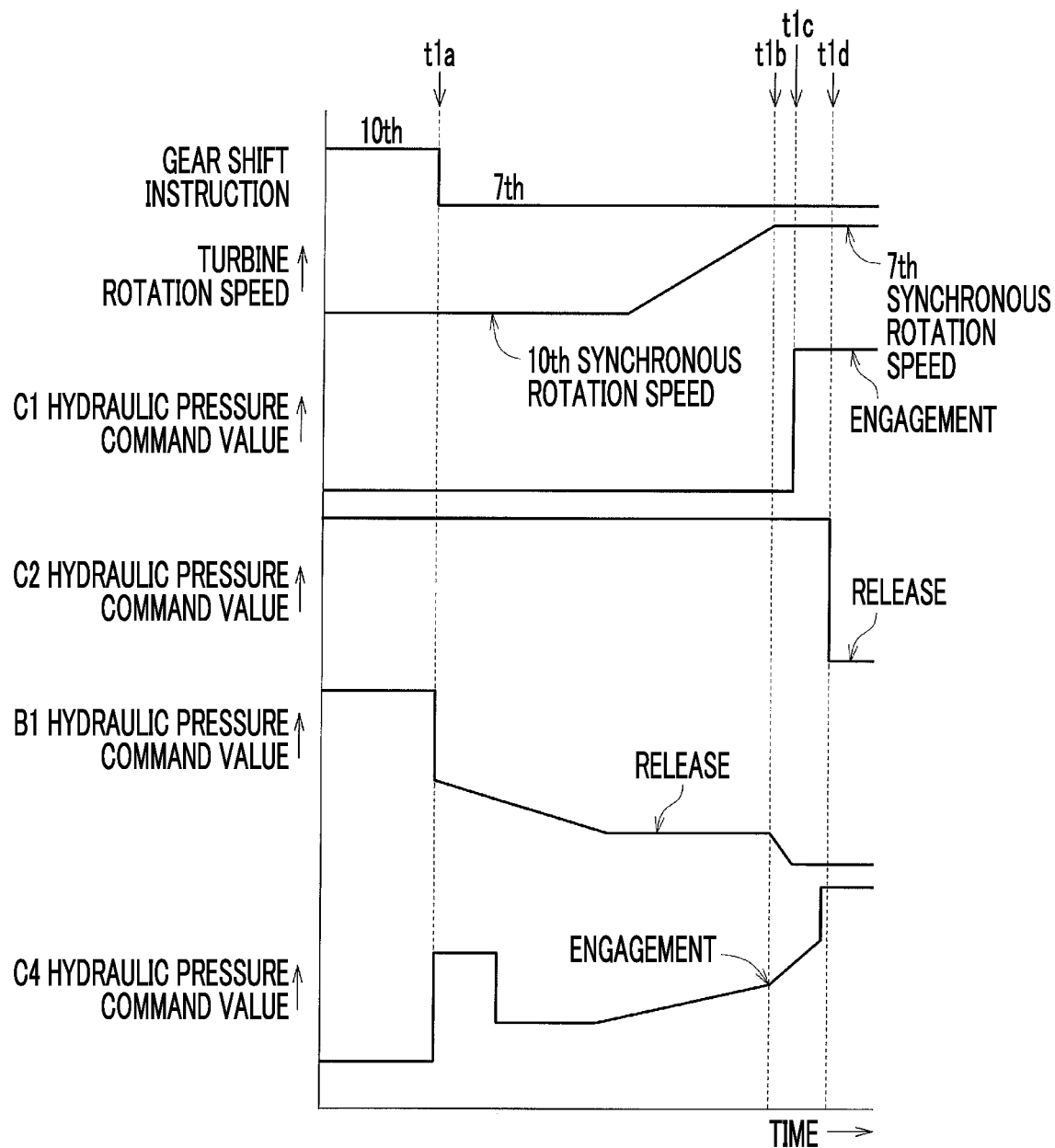
FIG. 5 is a timing chart showing transition of each of a signal of a gear shift instruction, a turbine rotation speed, and a hydraulic pressure command value of each frictional engagement element at the time of a gear shift from a tenth speed stage to a seventh speed stage of the automatic transmission.

FIG. 5 is a timing chart showing transition of each of a signal of a gear shift instruction at the time of a gear shift from the tenth speed stage to the seventh speed stage, a turbine rotation speed (the rotation speed of the input shaft 40), and a hydraulic pressure command value of each frictional engagement element.

In a state where the tenth speed stage is established, as shown in FIG. 2, the second clutch C2, the third clutch C3, and the first brake B1 are respectively brought into the engagement state, and the first clutch C1, the fourth clutch C4, and the second brake B2 are respectively brought into the release state.

If a gear shift instruction to the seventh speed stage at a timing t1a in FIG. 5 (if a gear shift to the seventh speed stage is requested), in order to pass through a state where the second clutch C2 as a specific clutch mechanism is brought into the engagement state and the seventh speed stage as a specific gear shift stage is established, while maintaining the engagement state of the second clutch C2, the fourth clutch C4 is switched from the release state to the engagement state, and the first brake B1 is switched from the engagement state to the release state. With this, the seventh speed stage where the second clutch C2, the third clutch C3, and the fourth clutch C4 are respectively in the engagement state, and the first clutch C1, the first brake B1, and the second brake B2 are respectively in the release state is established. A timing t1b in the drawing is a timing when the seventh speed stage is established. That is, the gear shift from the tenth speed stage to the seventh speed stage is performed only by switching a pair of frictional engagement elements such as switching the fourth clutch C4 from the release state to the engagement state and switching the first brake B1 from the engagement state to the release state.

In this way, the target seventh speed stage is obtained when other frictional engagement elements (the fourth clutch C4 and the first brake B1) are individually switched between the engagement state and the release state such that the seventh speed stage is established while maintaining the engagement state of the second clutch C2. For this reason, it is possible to reduce the time until the seventh speed stage is established. That is, when the skip gear shift operation is requested, it is possible to reduce the time until the seventh speed stage is established.

After the gear shift to the seventh speed stage is performed in this way, the first clutch C1 is switched from the release state to the engagement state (a timing t1c in the drawing), and then, the second clutch C2 is switched from the engagement state to the release state. With this, the seventh speed stage where the first clutch C1, the third clutch C3, and the fourth clutch C4 are respectively in the engagement state, and the second clutch C2, the first brake B1, and the second brake B2 are respectively in the release state is established. A timing t1*d* in the drawing is a timing when the seventh speed stage is established.

In this operation (the engagement operation of the first clutch C1 and the release operation of the second clutch C2), since the gear shift stage is not changed, an occupant does not feel this operation. As described above, a pair of synchronous rotating elements (the intermediate shaft 47 and the third sun gear 45*s*) has no difference of rotation in a state of being decoupled. For this reason, the release operation of the second clutch C2 is performed without adversely affecting the durability or the like of the second clutch C1 Furthermore, the engagement operation of the first clutch C1 is performed without adversely affecting the durability of the like of the first clutch C1. In addition, this operation (the engagement operation of the first clutch C1 and the release operation of the second clutch C2) becomes an operation in consideration of the clutch mechanism to be brought into the release state and the frictional engagement elements to be brought into the engagement state in the next gear shift operation. That is, the engagement state of the first clutch C1 and the release state of the second clutch C2 are obtained in advance in consideration of a gear shift to the sixth speed stage.

Next, the above-described second gear shift pattern will be described. As the second gear shift pattern, a case of a gear shift from the seventh speed stage to the fifth speed stage will be described. For example, a case where a skip gear shift to the fifth speed stage is requested by a power-on down-shift during traveling in the seventh speed stage or a case where a skip gear shift to the fifth speed stage is requested by a driver's shift operation is exemplified.

Figure 6:
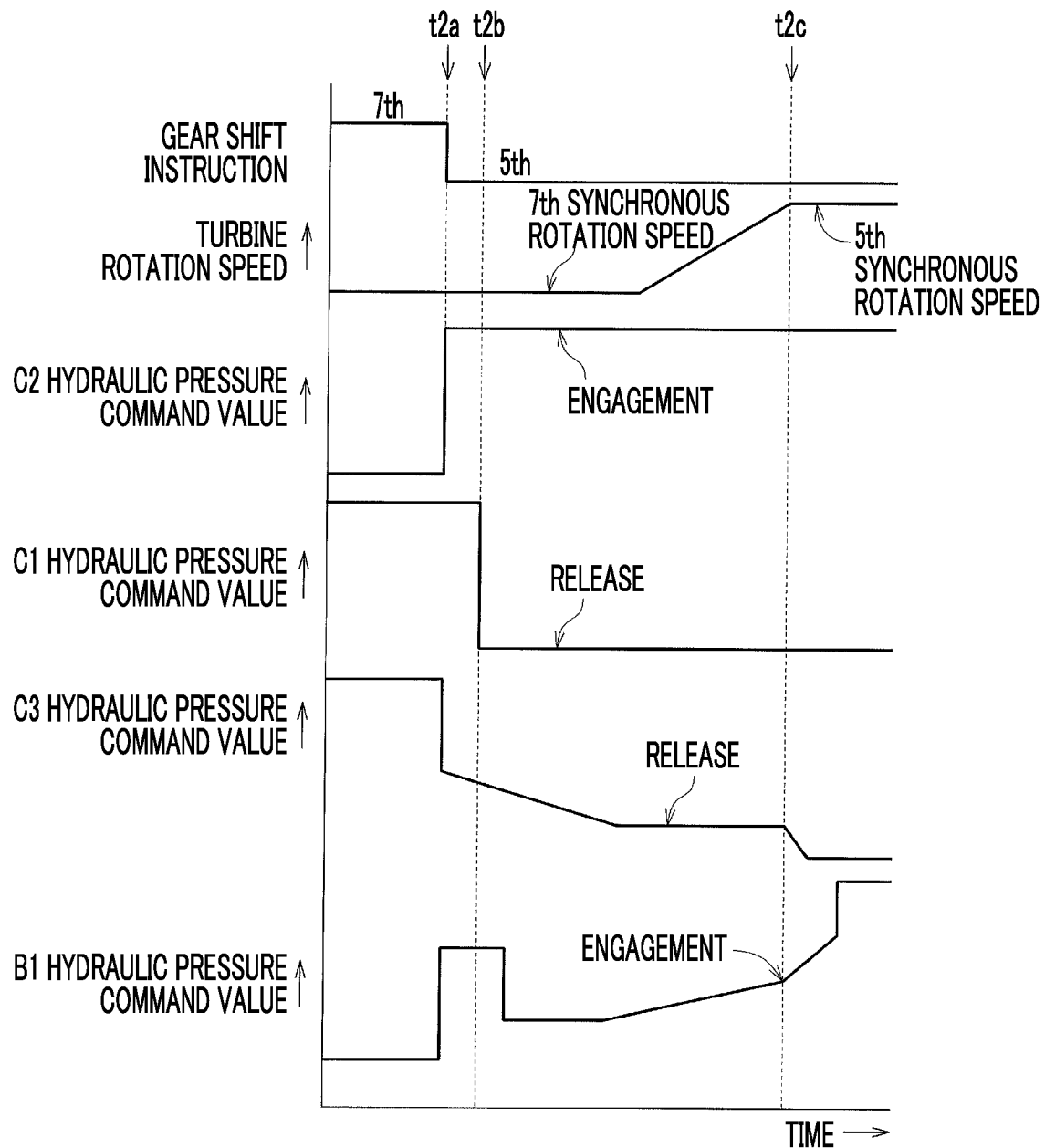
FIG. 6 is a timing chart showing transition of each of a signal of a gear shift instruction, a turbine rotation speed, and a hydraulic pressure command value of each frictional engagement element at the time of a gear shift from a seventh speed stage to a fifth speed stage of the automatic transmission.

FIG. 6 is a timing chart showing transition of each of a signal of a gear shift instruction at the time of a gear shift from the seventh speed stage to the fifth speed stage, a turbine rotation speed, and a hydraulic pressure command value of each frictional engagement element.

In a state where the seventh speed stage is established, as shown in FIG. 2, the first clutch C1, the third clutch C3, and the fourth clutch C4 are respectively brought into the engagement state, and the second clutch C2, the first brake B1, and the second brake B2 are respectively brought into the release state.

If a gear shift instruction to the fifth speed stage is output at a timing t2*a* in FIG. 6 (if a gear shift to the fifth speed stage is requested), in order to pass through a state where the second clutch C2 as a specific clutch mechanism is brought into the engagement state and the seventh speed stage as a specific gear shift stage is established, the second clutch C2 is switched from the release state to the engagement state. With this, the seventh speed stage where the first clutch C1, the second clutch C2, the third clutch C3, and the fourth clutch C4 are respectively in the engagement state, and the first brake B1 and the second brake B2 are respectively in the release state is established.

After the second clutch C2 is brought into the engagement state in this way, the first clutch C1 is switched from the engagement state to the release state (a timing t2*b* in the drawing). With this, the seventh speed stage where the second clutch C2, the third clutch C3, and the fourth clutch C4 are respectively in the engagement state, and the first clutch C1, the first brake B1, and the second brake B2 are respectively in the release state is established.

Thereafter, while maintaining the engagement state of the second clutch C2, the first brake B1 is switched from the release state to the engagement state, and the third clutch C3 is switched from the engagement state to the release state. With this, the fifth speed stage where the second clutch C2, the fourth clutch C4, and the first brake B1 are respectively in the engagement state, and the first clutch C1, the third clutch C3, and the second brake B2 are respectively in the release state is established. A timing t2*c* in the drawing is a timing when the fifth speed stage is established. That is, the gear shift from the seventh speed stage to the fifth speed stage is performed only by individually switching a pair of frictional engagement elements such as switching the first brake B1 from the release state to the engagement state and switching the third clutch C3 from the engagement state to the release state.

In the second gear shift pattern, the fifth speed stage is obtained by individually switching other frictional engagement elements between the engagement state and the release state such that the fifth speed stage is established while maintaining the engagement state of a specific clutch mechanism (second clutch C2) so as to maintain the coupled state of a pair of synchronous rotating elements (the intermediate shaft 47 and the third sun gear 45*s*). For this reason, it is possible to reduce the number of frictional engagement dements to be switched between the engagement state and the release state even in a case of a skip gear shift, and to suppress gear shift shock. Furthermore, as described above, since a pair of synchronous rotating elements (the intermediate shaft 47 and the third sun gear 45*s*) has no difference of rotation in a state of being decoupled, the engagement operation of the second clutch C2 is performed without adversely affecting the durability or the like of the second clutch C2.

Next, the above-described third gear shift pattern will be described. As the third gear shift pattern, a case of a gear shift from the tenth speed stage to the fifth speed stage will be described. For example, a case where a skip gear shift to the fifth speed stage is requested by a power-on down-shift during traveling in the tenth speed stage or a case where a skip gear shift to the fifth speed stage is requested by a driver's shift operation is exemplified. In the third gear shift pattern, a gear shift operation is made to pass through a state where the seventh speed stage as a specific gear shift stage is established by bringing the second clutch C2 into the engagement state halfway the gear shift from the tenth speed stage to the fifth speed stage. That is, even though a gear shift command is a gear shift command from the tenth speed stage to the fifth speed stage, the electronic control unit 50 selects to automatically pass through the seventh speed stage, and establishes the fifth speed stage after passing through the seventh speed stage (after passing through the seventh speed stage with no gear shift command to the seventh speed stage).

Figure 7:
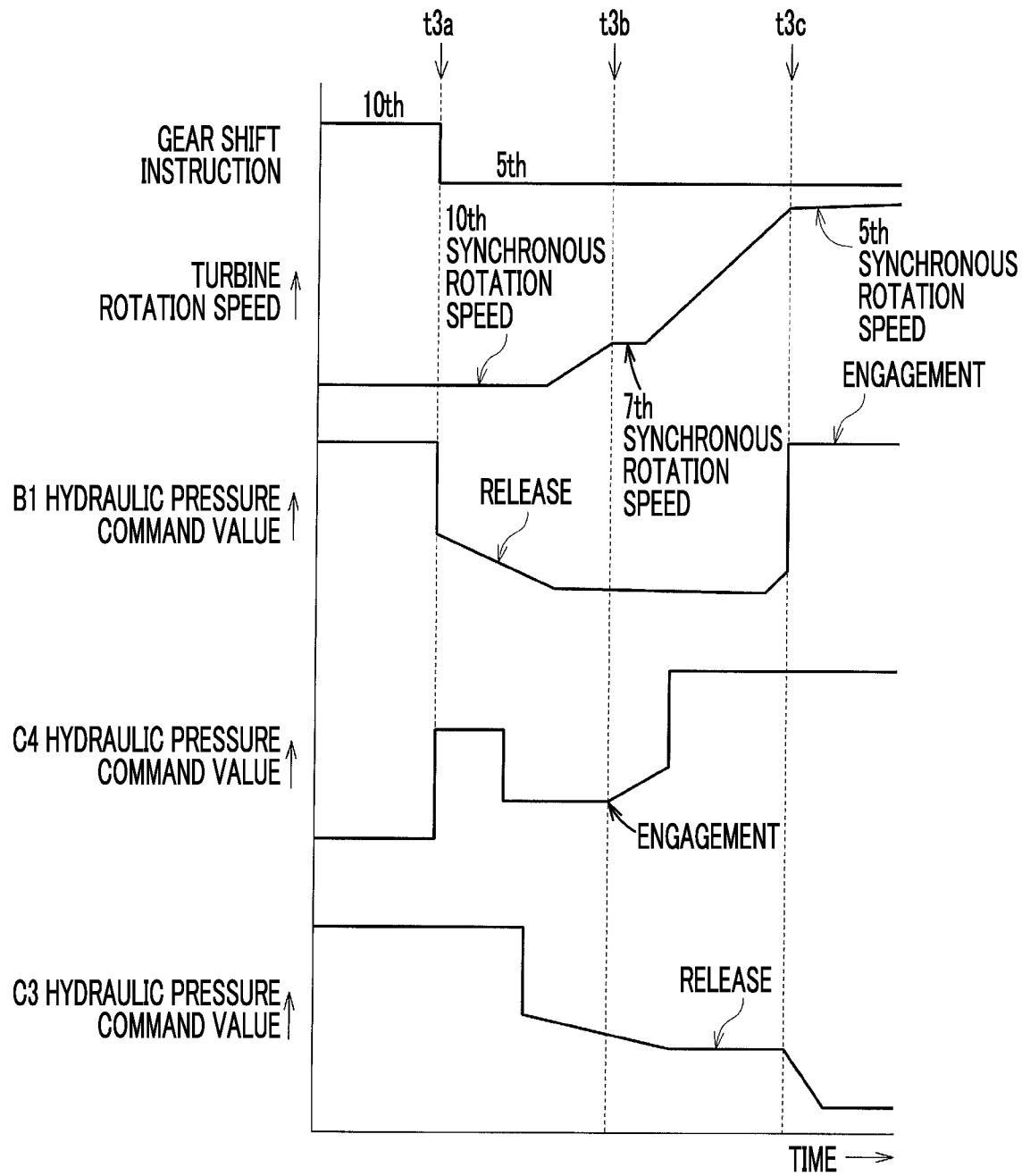
FIG. 7 is a timing chart showing transition of each of a signal of a gear shift instruction, a turbine rotation speed, and a hydraulic pressure command value of each frictional engagement element at the time of a gear shift from a tenth speed stage to a fifth speed stage of the automatic transmission.

FIG. 7 is a timing chart showing transition of each of a signal of a gear shift instruction at the time of a gear shift from the tenth speed stage to the fifth speed stage, a turbine rotation speed, and a hydraulic pressure command value of each frictional engagement element.

In a state where the tenth speed stage is established, as shown in FIG. 2, the second clutch C2, the third clutch C3, and the first brake B1 are respectively brought into the engagement state, and the first clutch C1, the fourth clutch C4, and the second brake B2 are respectively brought into the release state.

If a gear shift instruction to the fifth speed stage is output at a timing t3*a* in FIG. 7 (if a gear shift to the fifth speed stage is requested), in order to pass through a state where the second clutch C2 as a clutch mechanism is brought into the engagement state and the seventh speed stage as a specific gear shift stage is established, while maintaining the engagement state of the second clutch C2, the fourth clutch C4 is switched from the release state to the engagement state, and the first brake B1 is switched from the engagement state to the release state. With this, the seventh speed stage where the second clutch C2, the third clutch C3, and the fourth clutch C4 are respectively in the engagement state, and the first clutch C1, the first brake B1, and the second brake B2 are respectively in the release state is established. A timing t3b in the drawing is a timing when the seventh speed stage is established. That is, the gear shift from the tenth speed stage to the seventh speed stage is performed only by switching a pair of frictional engagement elements such as switching the fourth clutch C4 from the release state to the engagement state and switching the first brake B1 from the engagement state to the release state.

Thereafter, while the engagement state of the second clutch C2, the first brake B1 is switched from the release state to the engagement state, and the third clutch C3 is switched from the engagement state to the release state. With this, the fifth speed stage where the second clutch C2, the fourth clutch C4, and the first brake B1 are respectively in the engagement state, and the first clutch C1, the third clutch C3, and the second brake B2 are respectively in the release state is established. A timing t3c in the drawing is a timing when the fifth speed stage is established. That is, the gear shift from the seventh speed stage to the fifth speed stage is performed only by switching a pair of frictional engagement elements such as switching the first brake B1 from the release state to the engagement state and switching the third clutch C3 from the engagement state to the release state.

In the third gear shift pattern, a specific gear shift stage (seventh speed stage) is interposed in a gear shift operation between a gear shift stage (tenth speed stage) at the time of the start of the gear shift operation and a gear shift stage (fifth speed stage) at the time of the end of the gear shift operation, whereby it is possible to reduce the number of frictional engagement elements to be switched between the engagement state and the release state in each of the gear shift operation from the gear shift stage at the time of the start of the gear shift operation to the specific gear shift stage and the gear shift operation from the specific gear shift stage to the gear shift stage at the time of the end of the gear shift operation, and to suppress gear shift shock.

In the technique of the related art where a gear shift from the tenth speed stage to the fifth speed stage is performed without using the specific gear shift stage (seventh speed stage), in order to establish the fifth speed stage as a target gear shift stage while making the number of frictional engagement elements to be switched by a single switching operation equal to or less than two, a gear shift needs to be performed in an order of the tenth speed stage, the eighth speed stage (the release operation of the second clutch and the engagement operation of the fourth clutch), the sixth speed stage (the engagement operation of the first clutch and the release operation of the third clutch), and the fifth speed stage (the release operation of the first clutch and the engagement operation of the second clutch). That is, three gear shift operations need to be performed continuously. In contrast, in the above-described third gear shift pattern, it is possible to establish the fifth speed stage as a target gear shift stage only by performing two gear shift operations as described above.

In the third gear shift pattern, while two gear shifts are performed, since the gear ratio becomes large in all gear shifts, it is possible to sufficiently obtain traveling drive power (for example, drive power obtained by a power-on down-shift at the time of a depression operation of the accelerator pedal) requested by the driver.

Figure 8:
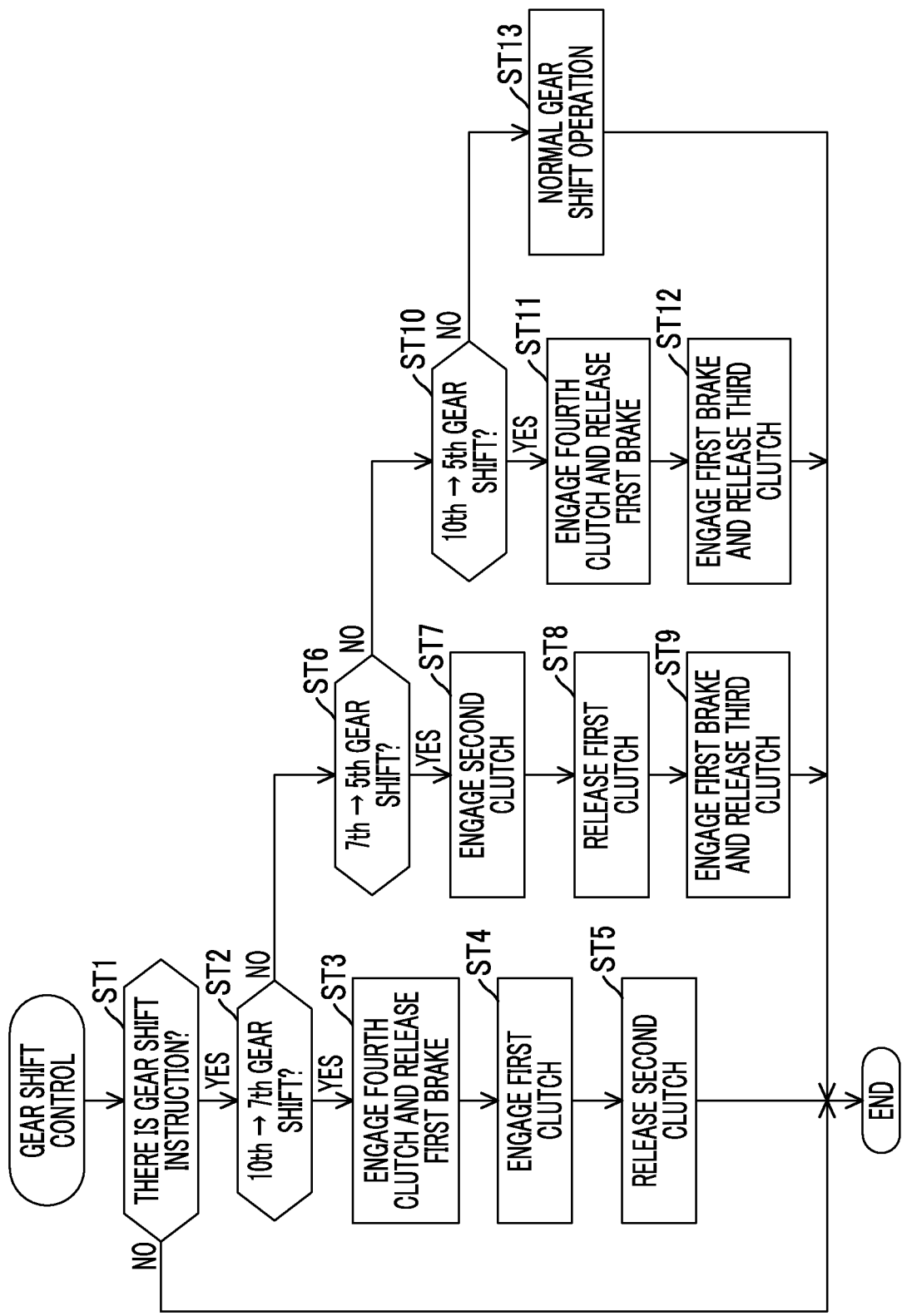
FIG. 8 is a flowchart showing a procedure of a gear shift control operation of the automatic transmission.

Next, a procedure of the gear shift control operation including the gear shift operation in each gear shift pattern described above will be described along the flowchart of FIG. 8. This flowchart is repeatedly executed at every predetermined time after the start of the engine.

First, in Step ST1, it is determined whether or not a gear shift instruction of the automatic transmission 4 occurs. This determination is performed according to a gear shift map (not shown) stored in a ROM of the electronic control unit 50. That is, it is determined the gear shift instruction occurs when a vehicle traveling state of spanning a gear shift line of the gear shift map (the vehicle speed or the accelerator pedal angle spans the gear shift line). This determination operation is well known, and thus, detailed description thereof will not be repeated.

When the gear shift instruction does not occur and it is determined in Step ST1 to be NO, it is determined that the gear shift operation is not required, and the process is returned as it is.

When the gear shift instruction occurs and it is determined in Step ST1 to be YES, the process progresses to Step ST2, and it is determined whether or not the gear shift instruction is a gear shift instruction from the tenth speed stage to the seventh speed stage. That is, it is determined whether or not the gear shift instruction in the first gear shift pattern.

When this determination is YES, as described in the above-described first gear shift pattern, while maintaining the engagement state of the second clutch C2, the fourth clutch C4 is switched from the release state to the engagement state, and the first brake B1 is switched from the engagement state to the release state (Step ST3; corresponding to an operation in the present disclosure to individually switch other frictional engagement elements between the engagement state and the release state such that a specific gear shift stage is established while maintaining the engagement state of a specific clutch mechanism so as to maintain the coupled state of a pair of synchronous rotating elements). With this, the seventh speed stage where the second clutch C2, the third clutch C3, and the fourth clutch C4 are respectively in the engagement state, and the first clutch C1, the first brake B1, and the second brake B2 are respectively in the release state is established (the timing t1b in the timing chart of FIG. 5).

Thereafter, in Step ST4, the first clutch C1 is switched from the release state to the engagement state (the timing t1c in the timing chart of FIG. 5), and then, in Step ST5, the second clutch C2 is switched from the engagement state to the release state (the timing t1d in the timing chart of FIG. 5; corresponding to an operation in the present disclosure to bring other frictional engagement elements into the engagement state such that a specific gear shift stage is established in a state where a specific clutch mechanism is brought into the release state to decouple a pair of synchronous rotating elements). With this, the seventh speed stage where the first clutch C1, the third clutch C3, and the fourth clutch C4 are respectively in the engagement state, and the second clutch C2, the first brake B1, and the second brake B2 are respectively in the release state is established.

With this, the gear shift from the tenth speed stage to the seventh speed stage is completed.

When it is determined in Step ST2 described above to be NO, the process progresses to Step ST6, and it is determined whether or not the gear shift instruction is a gear shift instruction from the seventh speed stage to the fifth speed stage. That is, it is determined whether or not the gear shift instruction is the gear shift instruction in the above-described second gear shift pattern.

When this determination is YES, as described in the above-described second gear shift pattern, the second clutch C2 is switched from the release state to the engagement state (Step ST7; corresponding to an operation in the present disclosure to bring from a state where a specific clutch mechanism is brought into the release state to decouple a pair of the synchronous rotating elements and a specific gear shift stage is established into a state where the specific clutch mechanism is brought into the engagement state to couple a pair of synchronous rotating elements and the specific gear shift stage is established). With this, the seventh speed stage where the first clutch C1, the second clutch C2, the third clutch C3, and the fourth clutch C4 are respectively in the engagement state, and the first brake B1 and the second brake B2 are respectively in the release state is established (the timing t2a in the timing chart of FIG. 6).

Thereafter, in Step ST8, the first clutch C1 is switched from the engagement state to the release state (the timing t2b in the timing chart of FIG. 6). With this, the seventh speed stage where the second clutch C2, the third clutch C3, and the fourth clutch C4 are respectively in the engagement state, and the first clutch C1, the first brake B1, and the second brake B2 are respectively in the release state is established.

Thereafter, in Step ST9, while maintaining the engagement state of the second clutch C2, the first brake B1 is switched from the release state to the engagement state, and the third clutch C3 is switched from the engagement state to the release state (the timing t2c in the timing chart of FIG. 6; corresponding to an operation in the present disclosure to individually switch other frictional engagement elements between the engagement state and the release state such that a gear shift stage at the time of the end of the gear shift operation is established while maintaining the engagement state of a specific clutch mechanism so as to maintain the coupled state of a pair of synchronous rotating elements). With this, the fifth speed stage where the second clutch C2, the fourth clutch C4, and the first brake B1 are respectively in the engagement state, and the first clutch C1, the third clutch C3, and the second brake B2 are respectively in the release state is established.

With this, the gear shift from the seventh speed stage to the fifth speed stage is completed.

When it is determined in Step ST6 described above to be NO, the progress progresses to Step ST10, and it is determined whether or not the gear shift instruction is a gear shift instruction from the tenth speed stage to the fifth speed stage. That is, it is determined whether or not the gear shift instruction is the gear shift instruction in the third gear shift pattern.

When this determination is YES, as described in the above-described third gear shift pattern, while maintaining the engagement state of the second clutch C2, the fourth clutch C4 is switched from the release state to the engagement state, and the first brake B1 is switched from the engagement state to the release state (Step ST11; corresponding to an operation in the present disclosure to individually switch other frictional engagement elements between the engagement state and the release state such that a specific gear shift stage is established while maintaining the engagement state of a specific clutch mechanism so as to maintain the coupled state of a pair of synchronous rotating elements). With this, the seventh speed stage where the second clutch C2, the third clutch C3, and the fourth clutch C4 are respectively in the engagement state, and the first clutch C1, the first brake B1, and the second brake B2 are respectively in the release state is established (the timing t3b in the timing chart of FIG. 7).

Thereafter, in Step ST12, while maintaining the engagement state of the second clutch C2, the first brake B1 is switched from the release state to the engagement state, and the third clutch C3 is switched from the engagement state to the release state (the timing t3c in the timing chart of FIG. 7; corresponding to an operation in the present disclosure to individually switch other frictional engagement elements between the engagement state and the release state such that a gear shift stage at the time of the end of a gear shift operation is established while maintaining the engagement state of a clutch mechanism to maintain the coupled state of a specific pair of synchronous rotating elements). With this, the fifth speed stage where the second clutch C2, the fourth clutch C4, and the first brake B1 are respectively in the engagement state and the first clutch C1, the third clutch C3, and the second brake B2 are respectively in the release state is established.

With this, the gear shift from the tenth speed stage to the fifth speed stage is completed.

When it is determined in Step ST10 to be NO, it is determined that the present gear shift instruction is none of the first to third gear shift patterns, the process progresses to Step ST13, and a normal gear shift operation is performed. As the normal gear shift operation, an operation is performed to individually switch the respective frictional engagement elements such that a target gear shift stage is established while reducing gear shift shock by reducing the number of frictional engagement elements to be switched, specifically, the target gear shift stage is established while making the number of frictional engagement elements to be switched by a single switching operation equal to or less than two. For example, in a case of a gear shift instruction from the ninth speed stage to the fifth speed stage, the sixth speed stage is established by first performing a switching operation of the two clutches (for example, the first clutch C1 and the second clutch C2) among the first to fourth clutches C1 to C4, and then, performing a switching operation of the remaining two clutches (for example, the third clutch C3 and the fourth clutch C4).

Since such an operation is performed, a control device for an automatic transmission according to the present disclosure is implemented by a program which is executed by the electronic control unit 50.

As described above, in this embodiment, when the seventh speed stage (specific gear shift stage) is included as a gear shift stage from a gear shift stage at the time of the start of a gear shift operation of the automatic transmission 4 to a gear shift stage at the time of the end of the automatic transmission 4, the gear shift operation is made to pass through a state where the intermediate shaft 47 and the third sun gear 45s (a pair of synchronous rotating elements) are coupled by bringing the second clutch C2 (specific clutch mechanism) into the engagement state and the seventh speed stage (specific gear shift stage) is established. In a state where the seventh speed stage (specific gear shift stage) is established, the intermediate shaft 47 and the third sun gear 45s (a pair of synchronous rotating elements) have no difference of rotation in a state of being decoupled. For this reason, when transition is made from a state where the second clutch C2 is brought into the engagement state and the seventh speed stage is established to a state where the second clutch C2 is brought into the release state and the seventh speed stage is established or when transition is made from a state where the second clutch C2 is brought into the release state and the seventh speed stage is established to a state where the second clutch C2 is brought into the engagement state and the seventh speed stage is established, the intermediate shaft 47 and the third sun gear 45s have no difference of rotation in a state of being decoupled. Accordingly, the rotation speeds of the rotating elements are not changed with change in engagement force of the second clutch C2. That is, the durability or the like of the second clutch C2 is not adversely affected. For this reason, coupling or decoupling of the intermediate shaft 47 and the third sun gear 45s is not limited. Therefore, a gear shift pattern in which the number of frictional engagement elements to be switched can be reduced with the use of the second clutch C2 is not limited, and it is possible to achieve expansion of the application range of the gear shift operation using the second clutch C2.

In this embodiment, the first clutch C1, the third clutch C3, and the fourth clutch C4 are basically engaged in the seventh speed stage (specific gear shift stage). That is, the seventh speed stage (specific gear shift stage) is prevented from being maintained over a long period in a state where the second clutch C2 is engaged. With this, as described above, it is possible to reduce the number of frictional engagement elements to be switched when a gear shift to the sixth speed stage or the eighth speed stage. Although fail determination (determination regarding whether or not the engagement force of the frictional engagement elements in the engagement state is properly obtained) of the frictional engagement elements is performed in a state where each gear shift stage is established, in a situation in which the seventh speed stage (specific gear shift stage) is maintained over a long period in a state where the second clutch C2 is engaged, fail determination of the second clutch C2 is also required in a state where the seventh speed stage is established. In this embodiment, since the first clutch C1, the third clutch C3, and the fourth clutch C4 are basically engaged in the seventh speed stage, the fail determination of the second clutch C2 is not required in a state where the seventh speed stage is established. With this, it is possible to prevent a fail determination operation from becoming complicated.

As described above, in this embodiment, in a state where the seventh speed stage (specific gear shift stage) is established, even if either clutch among the clutches C1 to C4 is brought into the release state, there is no difference of rotation in the rotating elements decoupled by this clutch. For this reason, in an engagement operation or a release operation of each of the clutches C1 to C4 from this state, special control for adjusting engagement force is not required. For example, hydraulic pressure adjustment control for reducing gear shift shock is not required. For this reason, it is possible to complete the engagement operation or the release operation of each of the clutches C1 to C4 in a short time, and to achieve reduction of the time required fir a gear shift operation.

Next, another embodiment will be described. The above-described embodiment is illustrative in all sorts of points, and does not serve as grounds for restrictive interpretation. Therefore, the technical scope of the present disclosure should not be interpreted based on only the above-described embodiment, but is determined based on the description of the scope of the claims. Furthermore, the technical scope of the present disclosure includes the equivalents and all sorts of alterations within the scope of the claims.

For example, in the above-described embodiment, although a case where the present disclosure is applied to a front engine-rear drive (FR) vehicle has been described, the present disclosure may be applied to a front engine-front drive (FF) vehicle or a four-wheel drive vehicle.

In the above-described embodiment, a case where the specific clutch mechanism in the present disclosure is the second clutch C2 has been described. As described above, since the seventh speed stage (specific gear shift stage) can be established by bringing the three clutches among a plurality of clutches C1 to C4 into the engagement state, it may be possible to make either of the clutches C1, C3, C4 other than the second clutch C2 function as the specific clutch mechanism in the present disclosure.

In the above-described embodiment, the automatic transmission 4 in which the specific gear shift stage in the present disclosure is the forward seventh speed stage has been described. The present disclosure is not limited thereto, and can be applied to an automatic transmission in which another gear shift stage becomes a specific gear shift stage.

In the above-described embodiment, although a case where a down-shift is performed as the gear shift operation has been described, the present disclosure can be applied to a case where an up-shift is performed.

The present disclosure can be applied to a control device for an automatic transmission which is mounted in a vehicle.

What is claimed is:

1. An automatic transmission comprising:
   a plurality of frictional engagement elements including a clutch mechanism configured to switch between an engagement state where a pair of rotating elements of a plurality of rotating elements is coupled and a release state where the plurality of rotating elements are uncoupled; and
   an electronic control unit configured to:
   (i) establish a gear shift stage among a plurality of gear shift stages of the automatic transmission by individually switching the plurality of frictional engagement elements between the engagement state and the release state,
   (ii) set a specific gear shift stage among the plurality of gear shift stages, the specific gear shift stage being a gear shift stage where, in a state where a predetermined frictional engagement element of the plurality of frictional engagement elements is switched to the engagement state and the gear shift stage is established, a pair of synchronous rotating elements of the plurality of rotating elements have equal rotational speed while being uncoupled in the release state,
   (iii) perform a gear shift operation with the specific gear shift stage, the gear shift operation including coupling the pair of synchronous rotating elements together by bringing a specific clutch mechanism corresponding to the predetermined frictional engagement element switched into the engagement state with the pair of synchronous rotating elements while the specific gear shift stage is established, the pair of synchronous rotating elements having the same rotational speed immediately prior to and during the coupling of the pair of synchronous rotating elements, and
   (iv) when both of the gear shift stage at a time of a start of the gear shift operation and the gear shift stage at a time of an end of the gear shift operation are gear shift stages different from the specific gear shift stage and are established when the specific clutch mechanism is switched to the engagement state and the pair of synchronous rotating elements is coupled:
   (i) individually switch the frictional engagement elements of the plurality of frictional engagement elements other than the specific clutch mechanism and the pair of synchronous rotating elements between the engagement state and the release state such that the specific gear shift stage is established while maintaining the engagement state of the specific clutch mechanism so as to maintain a coupled state of the pair of synchronous rotating elements, during a gear shift operation from the gear shift stage at the time of the start of the gear shift operation to the gear shift stage at the time of the end of the gear shift operation, and (ii) individually switch the frictional engagement elements of the plurality of frictional engagement elements other than the specific clutch mechanism and the pair of synchronous rotating elements between the engagement state and the release state such that the gear shift stage at the time of the end of the gear shift operation is established while maintaining the engagement state of the specific clutch mechanism so as to maintain the coupled state of the pair of synchronous rotating elements, after individually switching the frictional engagement elements of the plurality of frictional engagement elements other than the specific clutch mechanism and the pair of synchronous rotating elements between the engagement state and the release state.

2. The automatic transmission according to claim 1, wherein
each gear shift stage is established by bringing three frictional engagement elements of the plurality of frictional engagement elements into the engagement state, and the specific gear shift stage is established by bringing at least three frictional engagement elements of four frictional engagement elements of the plurality of frictional engagement elements including the specific clutch mechanism into the engagement state and bringing other frictional engagement elements of the plurality of frictional engagement elements into the release state.

3. The automatic transmission according to claim 1, wherein when the gear shift stage at the time of the start of the gear shift operation is different from the specific gear shift stage and is established when the specific clutch mechanism is brought into the engagement state and the pair of synchronous rotating elements is coupled, and the gear shift stage at the time of the end of the gear shift operation is the specific gear shift stage, the electronic control unit is configured to:

(i) individually switch the frictional engagement elements of the plurality of frictional engagement elements other than the specific clutch mechanism and the pair of synchronous rotating elements between the engagement state and the release state such that the specific gear shift stage is established while maintaining the engagement state of the specific clutch mechanism so as to maintain a coupled state of the pair of synchronous rotating elements, during a gear shift operation from the gear shift stage at the time of the start of the gear shift operation to the specific gear shift stage, and (ii) switch the frictional engagement elements of the plurality of frictional engagement elements other than the specific clutch mechanism and the pair of synchronous rotating elements into the engagement state such that the specific gear shift stage is established in a state where the specific clutch mechanism is switched to the release state and the pair of synchronous rotating elements is decoupled, after individually switching the frictional engagement elements of the plurality of frictional engagement elements other than the specific clutch mechanism and the pair of synchronous rotating elements between the engagement state and the release state.

4. The automatic transmission according to claim 1, wherein when the gear shift stage at the time of the start of the gear shift operation is the specific gear shift stage, and the gear shift stage at the time of the end of the gear shift operation is different from the specific gear shift stage and is established when the specific clutch mechanism is brought into the engagement state and the pair of synchronous rotating elements is coupled, the electronic control unit is configured to:

(i) switch the specific clutch mechanism into the release state to decouple the pair of synchronous rotating elements, the specific gear shift stage being established by bringing the specific clutch mechanism into the engagement state to couple the pair of synchronous rotating elements, during a gear shift operation from the specific gear shift stage to the gear shift stage at the time of the end of the gear shift operation, and (ii) individually switch the frictional engagement elements of the plurality of frictional engagement elements other than the specific clutch mechanism and the pair of synchronous rotating elements between the engagement state and the release state such that the gear shift stage at the time of the end of the gear shift operation is established while maintaining the engagement state of the specific clutch mechanism so as to maintain a coupled state of the pair of synchronous rotating elements, after establishing the specific gear shift stage.

5. The automatic transmission according to claim 1, wherein
(i) a shift gear mechanism in the automatic transmission includes a first planetary gear mechanism, a second planetary gear mechanism, and a Ravigneaux planetary gear mechanism with a third planetary gear mechanism and a fourth planetary gear mechanism combined,
(ii) a first carrier of the first planetary gear mechanism and a third carrier of the Ravigneaux planetary gear mechanism are coupled to an input shaft,
(iii) a second carrier of the second planetary gear mechanism is coupled to an output shaft,
(iv) a first sun gear of the first planetary gear mechanism and a second sun gear of the second planetary gear mechanism are coupled integrally to an intermediate shaft,
(v) a first clutch is provided between the intermediate shaft and a third ring gear of the Ravigneaux planetary gear mechanism,
(vi) a second clutch is provided between the intermediate shaft and a third sun gear of the third planetary gear mechanism of the Ravigneaux planetary gear mechanism,
(vii) a third clutch is provided between a second ring gear of the second planetary gear mechanism and the third ring gear of the Ravigneaux planetary gear mechanism,
(viii) a fourth clutch is provided between a first ring gear of the first planetary gear mechanism and the output shaft,
(ix) a fourth sun gear of the fourth planetary gear mechanism of the Ravigneaux planetary gear mechanism is coupled to a first brake,
(x) the second ring gear is coupled to a second brake, (xi) the electronic control unit is configured to switch forward 10-speed stages and a reverse 1-speed stage by bringing the first clutch, the second clutch, the third clutch, the fourth clutch, the first brake, and the second brake into an engagement state or a release state, and (xii) the specific clutch mechanism is the second clutch, and the pair of synchronous rotating elements is the third sun gear and the intermediate shaft, when the first clutch, the third clutch, and the fourth clutch are respectively in the engagement state, the second clutch, the first brake, and the second brake are respectively in the release state, and a forward seventh speed stage as the specific gear shift stage is established.

6. An automatic transmission comprising:

a plurality of frictional engagement elements including a clutch mechanism configured to switch between an engagement state where a pair of rotating elements of a plurality of rotating elements is coupled and a release state where the plurality of rotating elements are uncoupled;

a shift gear mechanism including a first planetary gear mechanism, a second planetary gear mechanism, and a Ravigneaux planetary gear mechanism with a third planetary gear mechanism and a fourth planetary gear mechanism combined;

a first carrier of the first planetary gear mechanism and a third carrier of the Ravigneaux planetary gear mechanism coupled to an input shaft;

a second carrier of the second planetary gear mechanism coupled to an output shaft;

a first sun gear of the first planetary gear mechanism and a second sun gear of the second planetary gear mechanism coupled integrally to an intermediate shaft;

a first clutch disposed between the intermediate shaft and a third ring gear of the Ravigneaux planetary gear mechanism;

a second clutch disposed between the intermediate shaft and a third sun gear of the third planetary gear mechanism of the Ravigneaux planetary gear mechanism;

a third clutch disposed between a second ring gear of the second planetary gear mechanism and the third ring gear of the Ravigneaux planetary gear mechanism;

a fourth clutch disposed between a first ring gear of the first planetary gear mechanism and the output shaft;

a fourth sun gear of the fourth planetary gear mechanism of the Ravigneaux planetary gear mechanism coupled to a first brake, the second ring gear being coupled to a second brake; and an electronic control unit configured to:

(i) establish a gear shift stage among a plurality of gear shift stages of the automatic transmission by individually switching the plurality of frictional engagement elements between the engagement state and the release state, (ii) set a specific gear shift stage among the plurality of gear shift stages, the specific gear shift stage being a gear shift stage where, in a state where a predetermined frictional engagement element of the plurality of frictional engagement elements is switched to the engagement state and the gear shift stage is established, a pair of synchronous rotating elements of the plurality of rotating elements have equal rotational speed while being uncoupled in the release state, (iii) perform a gear shift operation with the specific gear shift stage, the gear shift operation including coupling the pair of synchronous rotating elements together by bringing a specific clutch mechanism corresponding to the predetermined frictional engagement element switched into the engagement state with the pair of synchronous rotating elements while the specific gear shift stage is established, the pair of synchronous rotating elements having a same rotational speed immediately prior to and during the coupling of the pair of synchronous rotating elements, and (iv) switch forward 10-speed stages and reverse 1-speed stage by bringing the first clutch, the second clutch, the third clutch, the fourth clutch, the first brake, and the second brake into an engagement state or a release state, wherein the specific clutch mechanism is the second clutch, and the pair of synchronous rotating elements is the third sun gear and the intermediate shaft, when the first clutch, the third clutch, and the fourth clutch are respectively in the engagement state, the second clutch, the first brake, and the second brake are respectively in the release state, and a forward seventh speed stage as the specific gear shift stage is established.

* * * * *